United States Patent
Lee et al.

(10) Patent No.: US 11,733,737 B2
(45) Date of Patent: Aug. 22, 2023

(54) COVER STRUCTURE OF MOBILE DEVICE

(71) Applicant: Getac Technology Corporation, Hsinchu County (TW)

(72) Inventors: Kun-Cheng Lee, Taipei (TW); Juei-Chi Chang, Taipei (TW)

(73) Assignee: GETAC TECHNOLOGY CORPORATION, Hsinchu County (TW)

( * ) Notice: Subject to any disclaimer, the term of this patent is extended or adjusted under 35 U.S.C. 154(b) by 197 days.

(21) Appl. No.: 17/397,122

(22) Filed: Aug. 9, 2021

(65) Prior Publication Data
US 2022/0091638 A1    Mar. 24, 2022

(30) Foreign Application Priority Data

Sep. 23, 2020  (CN) .......................... 202011009852.9

(51) Int. Cl.
*G06F 1/16* (2006.01)
*E05C 19/02* (2006.01)
*E05C 19/10* (2006.01)

(52) U.S. Cl.
CPC .......... *G06F 1/1658* (2013.01); *E05C 19/028* (2013.01); *E05C 19/10* (2013.01); *G06F 1/1684* (2013.01); *E05Y 2201/11* (2013.01); *E05Y 2800/12* (2013.01); *E05Y 2900/606* (2013.01)

(58) Field of Classification Search
CPC .................................................... G06F 1/1684
See application file for complete search history.

(56) References Cited

U.S. PATENT DOCUMENTS

| | | | |
|---|---|---|---|
| 8,934,224 B2* | 1/2015 | Iwamoto | G06F 1/1616 439/153 |
| 9,282,659 B2* | 3/2016 | Lee | H05K 5/03 |
| 9,529,392 B2* | 12/2016 | Lee | G06F 1/1656 |
| 9,668,370 B1* | 5/2017 | Huang | H05K 5/0217 |
| 10,185,357 B2* | 1/2019 | Kanbayashi | G06F 1/1656 |
| 10,429,898 B2* | 10/2019 | Yoshioka | G06F 1/1656 |
| 10,547,134 B1* | 1/2020 | Lee | H01R 24/60 |
| 10,743,431 B2* | 8/2020 | Shindo | H01R 13/5213 |
| 10,990,135 B2* | 4/2021 | Joo | G06F 1/1613 |
| 11,032,927 B2* | 6/2021 | Lee | G06F 1/182 |
| 2005/0124191 A1* | 6/2005 | Stanton | H01R 13/5213 439/135 |
| 2014/0080334 A1* | 3/2014 | Tetsuya | H01R 13/5213 439/136 |

(Continued)

*Primary Examiner* — Adrian S Wilson
(74) *Attorney, Agent, or Firm* — Locke Lord LLP; Tim Tingkang Xia, Esq.

(57) ABSTRACT

The present invention provides a cover structure, which includes a body, a first cover and a second cover. The body is provided with a first opening and a second opening. The first opening and the second opening are adjacent and are configured at an interval from each other so as to form a frame between the first opening and the second opening. The first cover includes a first cover plate and a first seat plate. The second cover includes a second cover plate and a second seat plate. The first and second seat plates are disposed in a protruding manner on side edges of the first and second cover plates, and are fixedly connected to the frame. The first and second cover plates cover the first and second openings, and are turnable relative to the first and second seat plates so as to open the first and second openings.

16 Claims, 16 Drawing Sheets

(56) References Cited

U.S. PATENT DOCUMENTS

| | | | |
|---|---|---|---|
| 2014/0084770 A1* | 3/2014 | Tsai | G06F 1/181 |
| | | | 312/223.2 |
| 2014/0368994 A1* | 12/2014 | Lee | H05K 5/061 |
| | | | 361/679.55 |
| 2015/0047262 A1* | 2/2015 | Lee | G06F 1/1675 |
| | | | 49/477.1 |
| 2016/0027465 A1* | 1/2016 | Lee | G11B 17/0405 |
| | | | 720/613 |
| 2016/0360630 A1* | 12/2016 | Oda | A45F 5/00 |
| 2021/0089088 A1* | 3/2021 | Lee | E05D 5/04 |

* cited by examiner

COVER STRUCTURE OF MOBILE DEVICE

CROSS-REFERENCE TO RELATED APPLICATIONS

The present application claims priority to a CN Patent Application No. 202011009852.9, filed on Sep. 23, 2020, and the disclosure of which is also hereby incorporated by reference herein in its entirety.

BACKGROUND OF THE INVENTION

Field of the Invention

The present invention relates to a cover structure of a mobile device, and more particularly to a cover structure of a mobile device for easy maintenance and partial replacement.

Description of the Prior Art

A current military laptop computer is usually configured with an opening cover at each opening of a body thereof to provide waterproofness and dustproofness. In the current design of such cover, two covers are connected to the same pivot, and the pivot is then locked between two adjacent openings of the body. One drawback of this design is that, when one of the covers is damaged, the entire assembly of the covers on both sides needs to be replaced, resulting in material waste. Further, each cover needs to be customized corresponding to the opening of individual models, and the current cover structure cannot be separately changed corresponding to only one side. For similar models, the possibility of changing the design of an opening on one side is much higher than that of both sides, which also limits the possibility of design.

In view of the above, on the basis of extensive development with the practice of theories, the Inventor is targeted at an object of improving the above issues with respect of the above prior art.

SUMMARY OF THE INVENTION

The present invention provides a cover structure of a mobile device for easy maintenance and partial replacement.

A cover structure of a mobile device provided by the present invention includes a body, a first cover and a second cover. The body is provided with a first opening and a second opening. The first opening and the second opening are adjacent and are configured at an interval from each other so as to form a frame between the first opening and the second opening. The first cover includes a first cover plate and a first seat plate. The first seat plate is disposed in a protruding manner on a side edge of the first cover plate, and is fixedly connected to the frame. The first cover plate covers the first opening, and is turnable relative to the first seat plate so as to open the first opening. The second cover includes a second cover plate and a second seat plate. The second seat plate is disposed in a protruding manner on a side edge of the second cover plate, and is fixedly connected to the frame. The second cover plate covers the second opening.

In the cover structure of a mobile device of the present invention, a first bend groove is provided between the first cover plate and the first seat plate, and the first cover plate is turnable relative to the first seat plate along the first bend groove. At least one connector is disposed in the first opening. Contours of edges of the first seat plate and the second seat plate are fitted with each other. The edge of the first seat plate and the edge of the second seat plate overlap with each other. The edge of the first seat plate and the edge of the second seat plate are hooked with each other. The first cover plate is provided with a first sliding fastener for fitting connecting the body, and the first sliding fastener is movable relative to the first cover plate so as to release the body. A first sealing plug is provided on a surface of the first cover plate. When the first cover plate covers the first opening, the first sealing plug is sandwiched between the first cover plate and the body and seals the first opening. A first sliding fastener for fitting connecting the body is sleeved on another surface of the first cover plate, and the first sliding fastener is movable relative to the first cover plate so as to release the body. A second sealing plug is provided on a surface of the second cover plate. When the second cover plate covers the second opening, the second sealing plug is sandwiched between the second cover plate and the body and seals the second opening.

In the cover structure of a mobile device of the present invention, a first sealing plug is provided on one surface of the first cover plate. When the first cover plate covers the first opening, the first sealing plug is sandwiched between the first cover plate and the body, and seals the first opening. The second cover plate is turnable relative to the second seat plate. A second bend groove is provided between the second cover plate and the second seat plate. The second cover plate is tunable relative to the second seat plate along the second bend groove so as to open the second opening. A first sliding fastener for fitting connecting the body is provided on the first cover plate, and the first sliding fastener is movable relative to the first cover plate so as to release the body. A first sealing plug is provided on a surface of the first cover plate. When the first cover plate covers the first opening, the first sealing plug is sandwiched between the first cover plate and the body, and seals the first opening. A first sliding fastener for fitting connecting the body is sleeved on another surface of the first cover plate, and the first sliding fastener is movable relative to the first cover plate so as to release the body. At least one second connector is disposed in the second opening.

In the cover structure of a mobile device of the present invention, the adjacent first cover and second cover can share a fixing point, and the first cover and the second cover can be replaced individually. When one of the first cover and the second cover is damaged, only the one with damage needs to be replaced instead of simultaneously replacing both, thereby avoiding unnecessary waste, reducing maintenance costs and providing good application flexibilities.

DETAILED DESCRIPTION OF THE EMBODIMENTS

Figure 1:
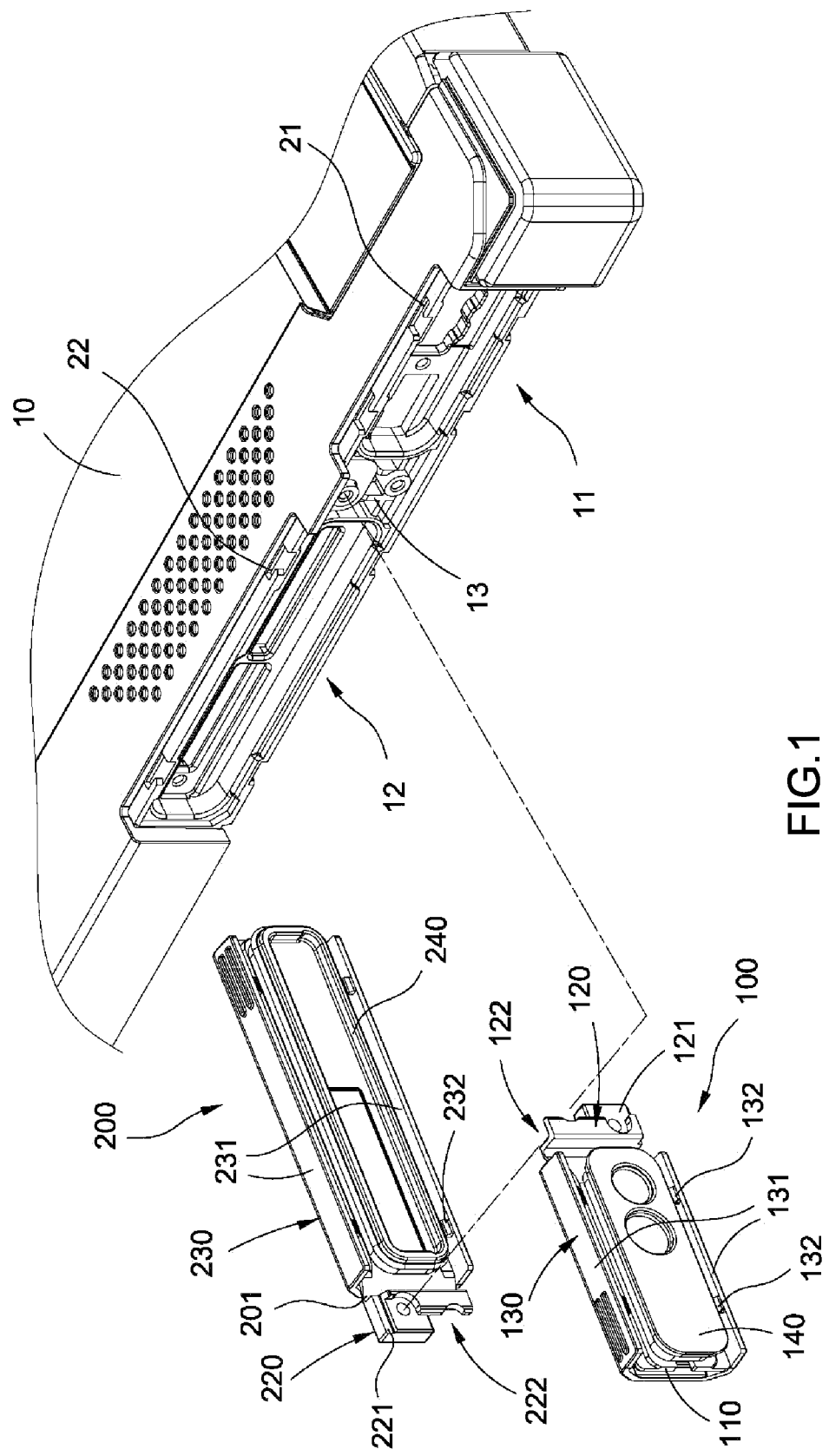
FIG. 1 is an exploded three-dimensional schematic diagram of a cover structure of a mobile device according to a first embodiment of the present invention.

Referring to FIG. 1, a cover structure of a mobile device is provided according to a first embodiment of the present invention. The cover structure includes a body 10, a first cover 100 and a second cover 200. The body 10 is provided with a first opening 11 and a second opening 12. The first opening 11 and the second opening 12 are adjacent and are disposed at an interval from each other so as to form a frame 13 between the first opening 11 and the second opening 12. At least one first connector is disposed in the first opening 11. At least one second connector is disposed in the second opening 12. The first connector and the second connector are not shown in the drawings. The first connector and the second connector can be connectors of any form selected according to requirements, for example, a USB type-A, micro-USB type-C, VGA, DVI, HDMI, DisplayPort, MiniDisplayPort, RJ45, RJ11, RS232 connector, or a card driver (SD, mini SD, micro SD, and RF), and are not limited by the present invention.

The first cover 100 includes a first cover plate 110 and a first seat plate 120. The first cover plate 110 and the first seat plate 120 are integrally connected. The first seat plate 120 is disposed in a protruding manner on a side edge of the first cover plate 110, and is fixedly connected to the frame 13. In this embodiment, preferably, the first seat plate 120 is fixedly connected to the frame 13 by means of locking with a screw. The first cover plate 110 covers the first opening 11, and is turnable relative to the first cover plate 120 so as to open the first opening 11. Specifically, a first bend groove 101 is provided between the first cover plate 110 and the first seat plate 120, accordingly allowing the first cover plate 110 to turn relative to the first seat plate 120 along the first bend groove 101.

The second cover 200 includes a second cover plate 210 and a second seat plate 220. The second cover plate 210 and the second seat plate 220 are integrally connected. The second seat 220 is disposed in a protruding manner on a side edge of the second cover plate 210, and is fixedly connected to the frame 13. In this embodiment, preferably, the second seat plate 220 is fixedly connected to the frame 13 by means of locking with a screw. The second cover plate 210 covers the second opening 12, and is turnable relative to the second seat plate 220 so as to open the second opening 12. Specifically, a second bend groove 201 is provided between the second cover plate 210 and the second seat plate 220, accordingly allowing the second cover plate 210 to turn relative to the second seat plate 220 along the second bend groove 201.

Figure 6:
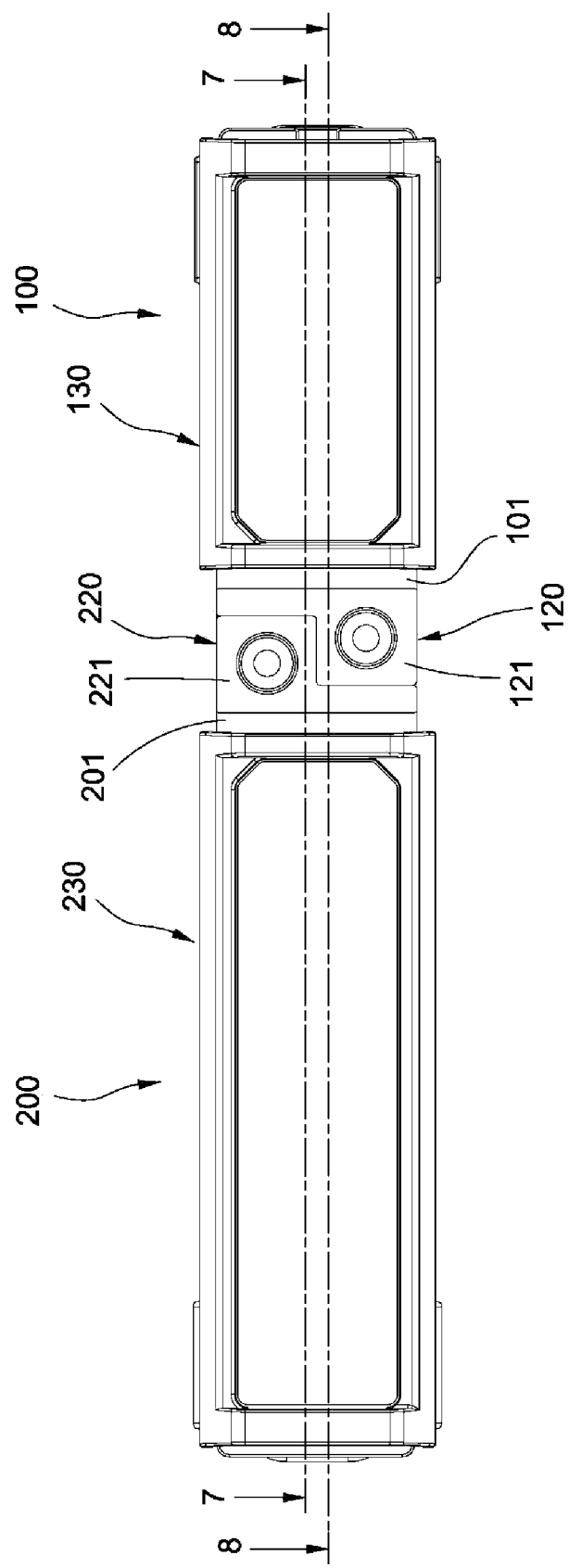
FIG. 6 is an assembly schematic diagram of a cover structure of a mobile device according to the first embodiment of the present invention.
Figure 7:
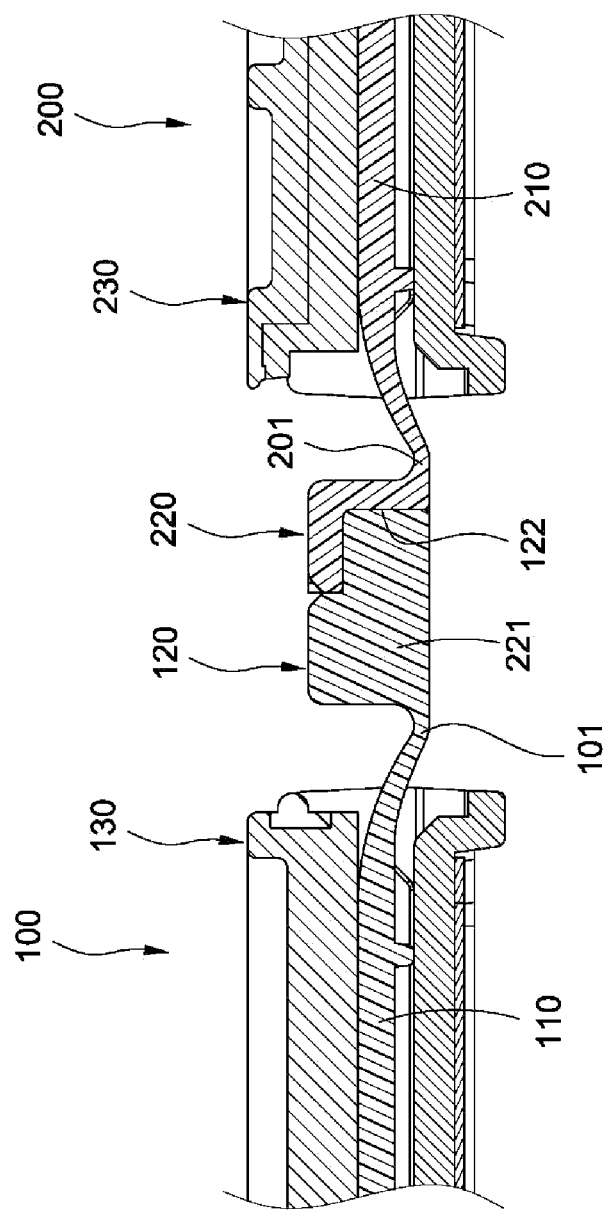
FIG. 7 and FIG. 8 are section diagrams of FIG. 6.
Figure 8:
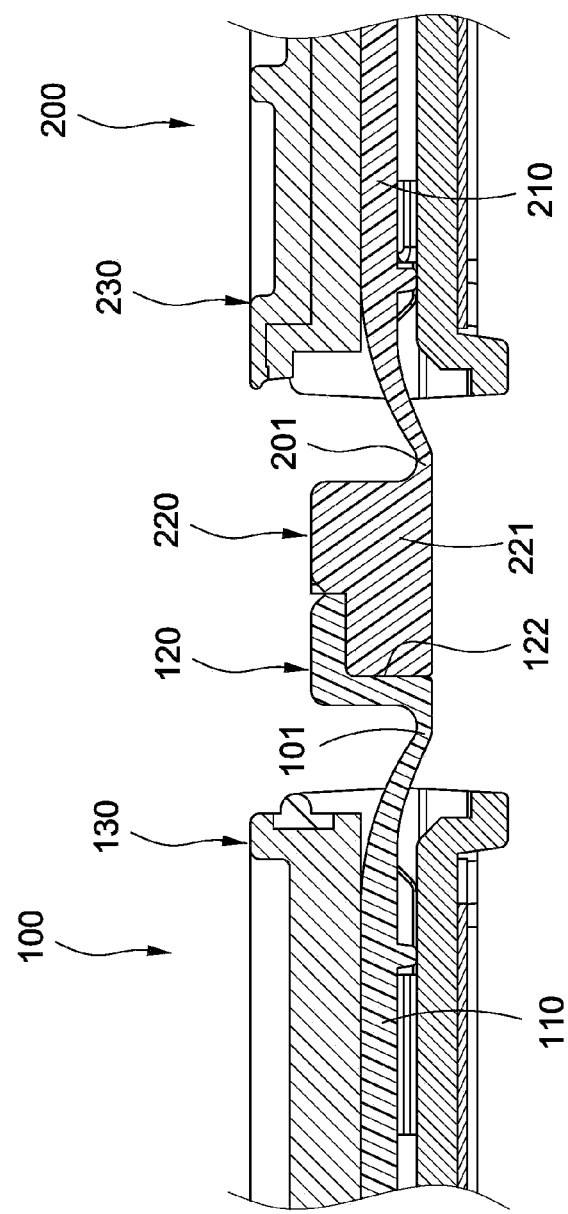

Referring to FIG. 1, in this embodiment, a first protrusion 121 is formed on one side of the first seat plate 120, and is provided with a first lock hole for locking the first protrusion 121 to the frame 13 of the body 10, and a first receiving slot 122 located next to the first protrusion 121 is formed on the other side of the first seat plate 120. A second protrusion 221 is formed on one side of the second seat plate 220, and is provided with a second lock hole for locking the second protrusion 221 to the frame 13 of the body 10, and a second receiving slot 222 located next to the second protrusion 221 is formed on the other side of the second seat plate 220. The first protrusion 121 and the second protrusion 221 are locked next to each other on the frame 13, such that contours of edges of the first seat plate 120 and the second plate 220 are fitted with each other, as shown in FIG. 6. In addition, the first protrusion 121 is fixedly received in the second receiving slot 222 as shown in FIG. 7, and the second protrusion 221 is fixedly received in the first receiving slot 122 as shown in FIG. 8, thereby allowing the edge of the first seat plate 120 and the edge of the second seat plate 220 to overlap with each other. The mutual fitting and overlapping structure of the edges enables the first seat plate 120 and the second seat plate 220 to securely contain each other, so that the first seat plate 120 and the second seat plate 220 are capable of preventing unexpected disengagement even if the screw on either of the sides falls off.

Figure 2:
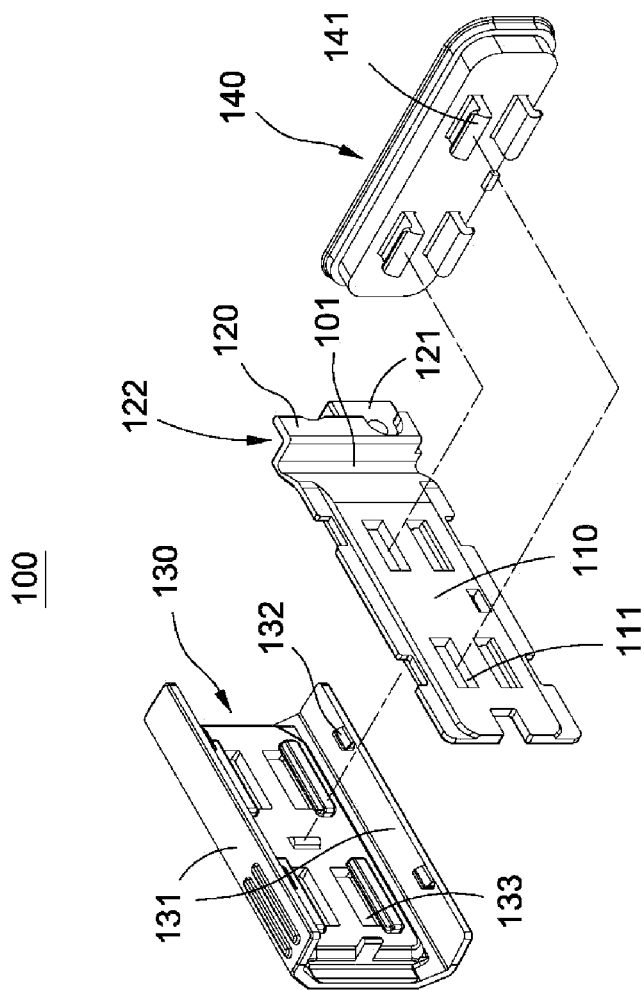
FIG. 2 is an exploded three-dimensional schematic diagram of a first cover in a cover structure of a mobile device according to the first embodiment of the present invention.
Figure 4:
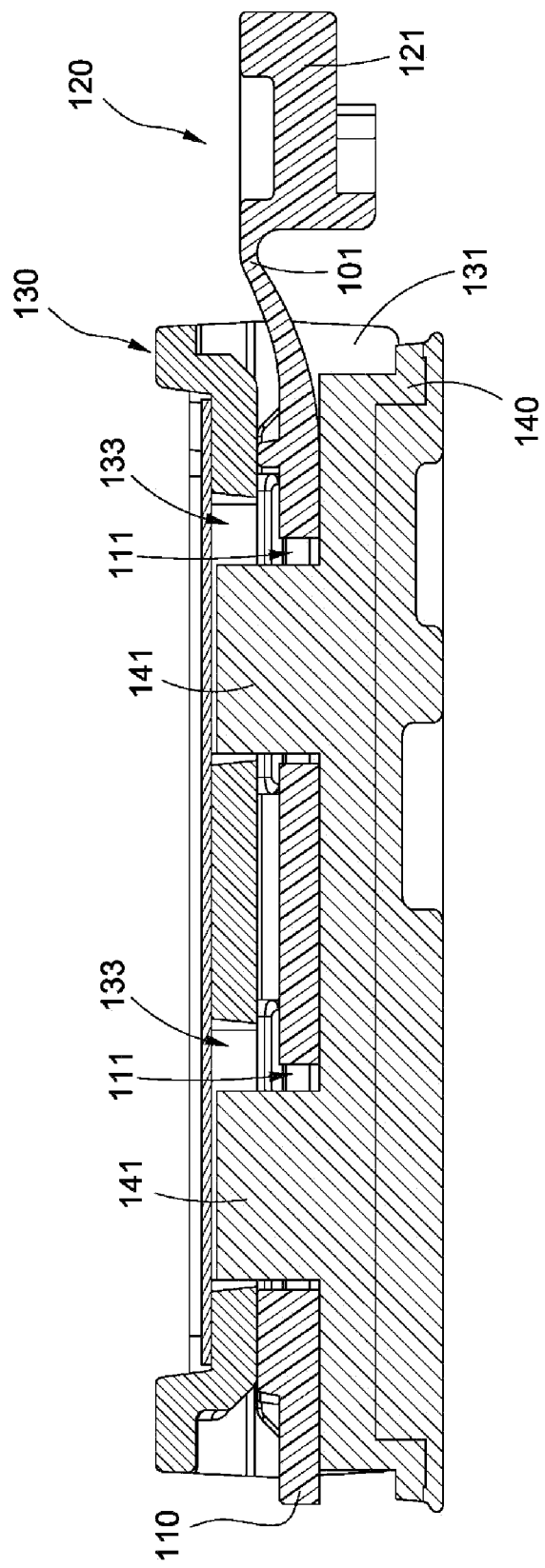
FIG. 4 is a vertical section diagram of a first cover in a cover structure of a mobile device according to the first embodiment of the present invention.
Figure 5:
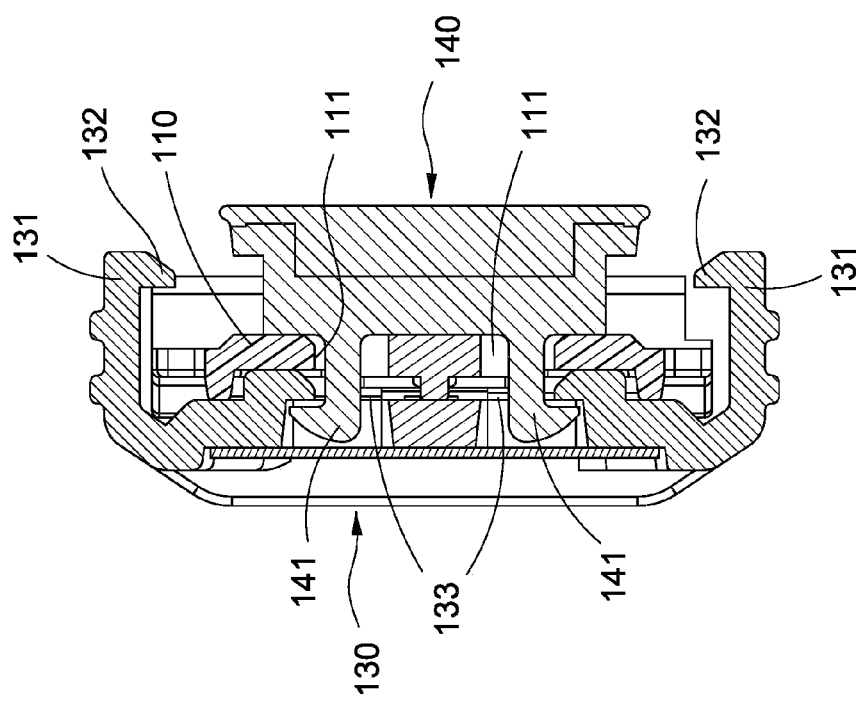
FIG. 5 is a horizontal section diagram of a first cover in a cover structure of a mobile device according to the first embodiment of the present invention.

Referring to FIG. 2, FIG. 4 and FIG. 5, a first sealing plug 140 is provided on a surface of the first cover plate 110. When the first cover plate 110 covers the first opening 11, the first sealing plug 140 is sandwiched between the first cover plate 110 and the body 10 and seals the first opening 11. Specifically, the first cover plate 110 is provided with at least one first positioning hole 111. In this embodiment, the first cover plate 110 is preferably provided with four first positioning holes 111 with the same function; however, the present invention does not limit the number of the first positioning holes. At least one first hook 141 is correspondingly extended on the first sealing plug 140. In this embodiment, four first hooks 141 are preferably extended on the first sealing plug 140, and each of the first hooks 141 passes through the corresponding first positioning hole 111.

Figure 9:
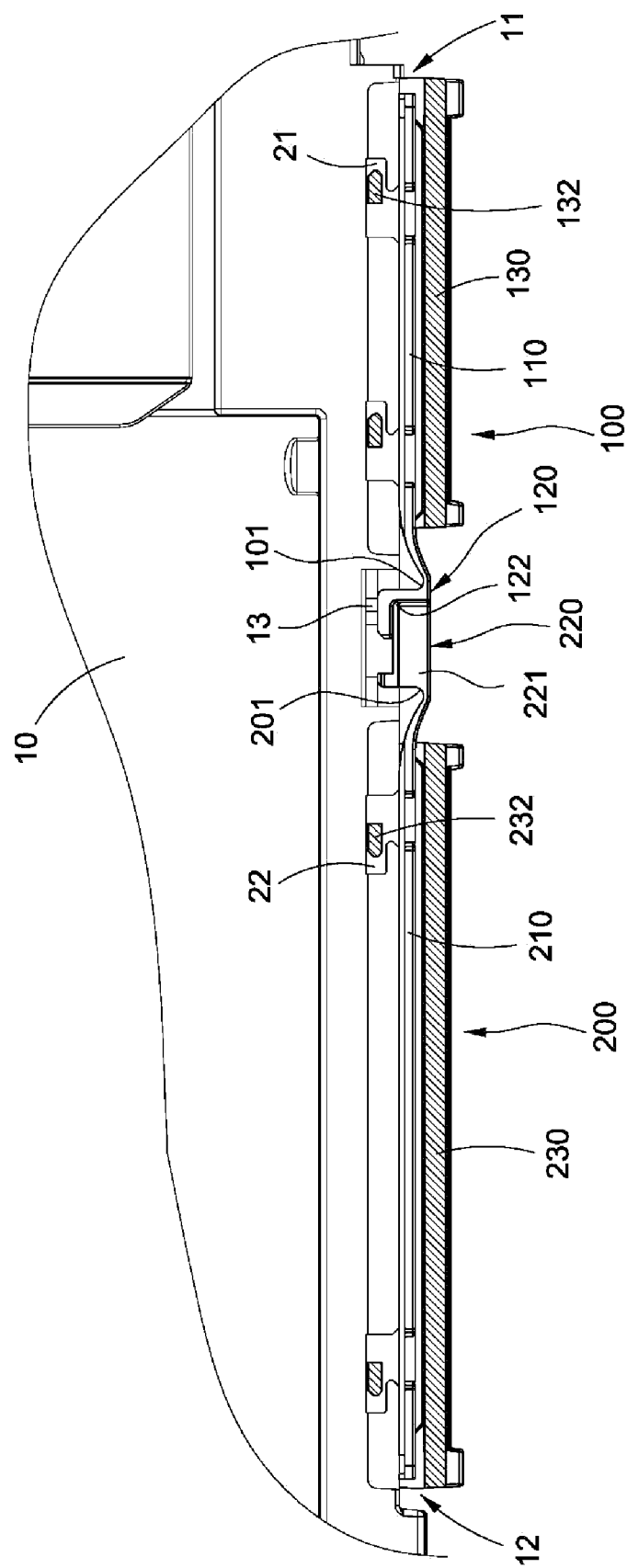
FIG. 9 is a schematic diagram of an unlocked state of a door structure of a mobile device according to the first embodiment of the present invention.
Figure 10:
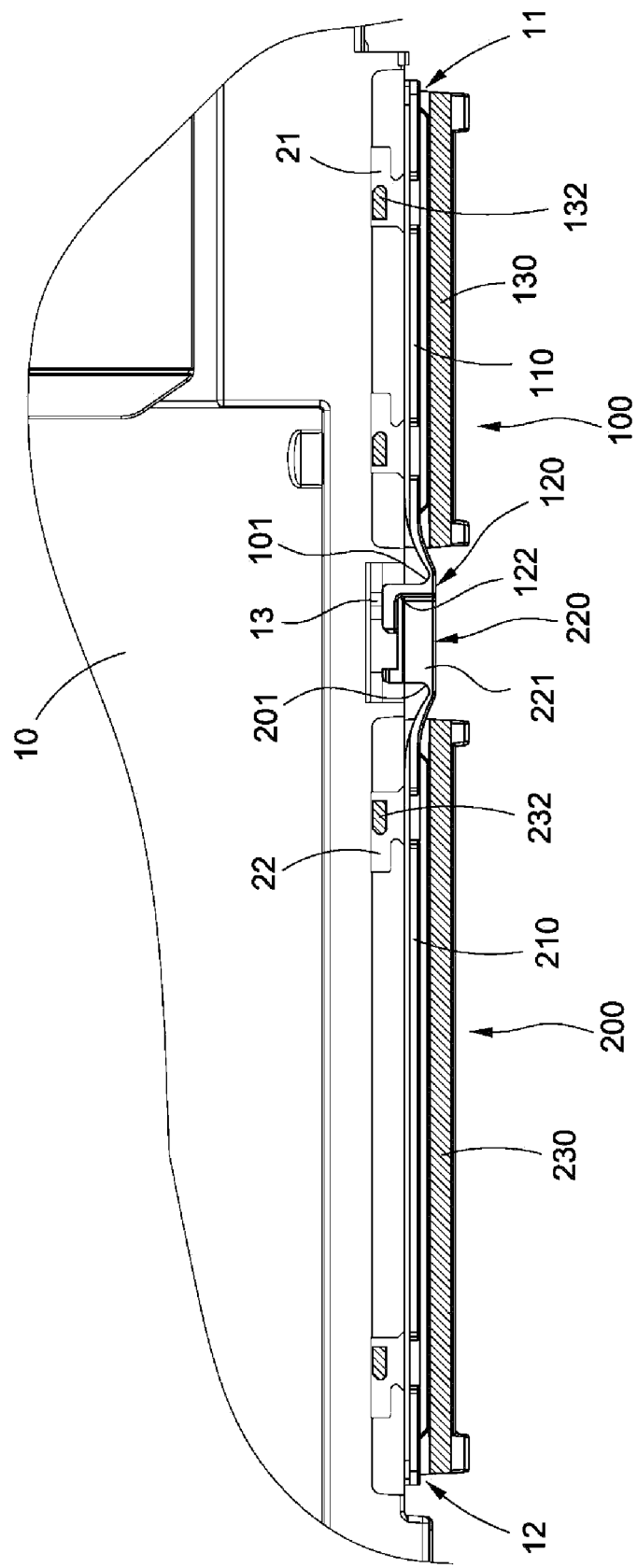
FIG. 10 is a schematic diagram of a locked state of a door structure of a mobile device according to the first embodiment of the present invention.
Figure 11:
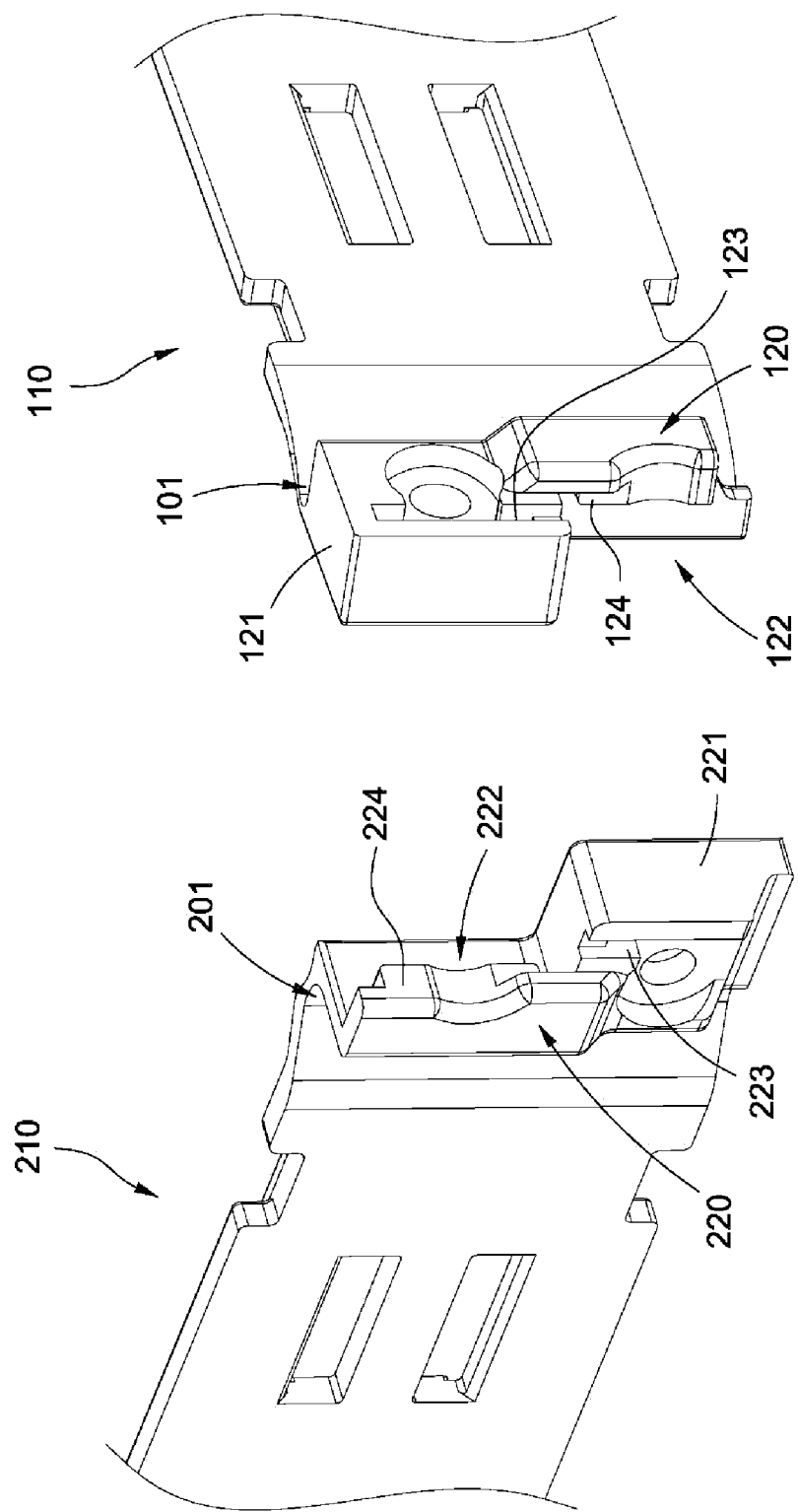
FIG. 11 is a schematic diagram of another pattern of a door structure of a mobile device according to the first embodiment of the present invention.
Figure 12:
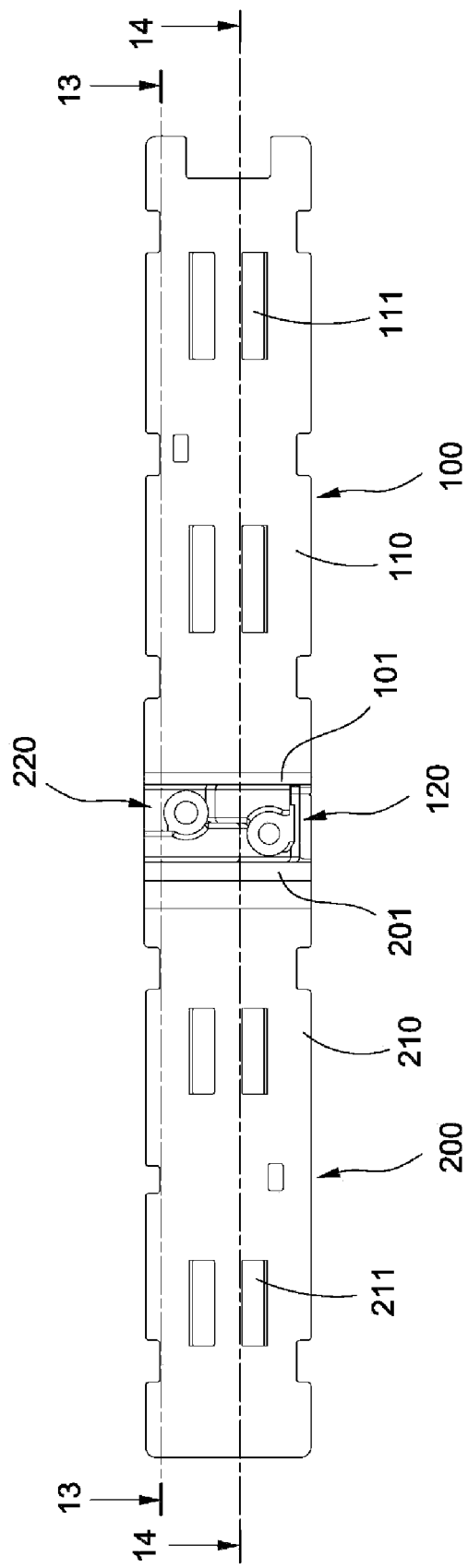
FIG. 12 is an assembly schematic diagram of the pattern in FIG. 11.
Figure 13:
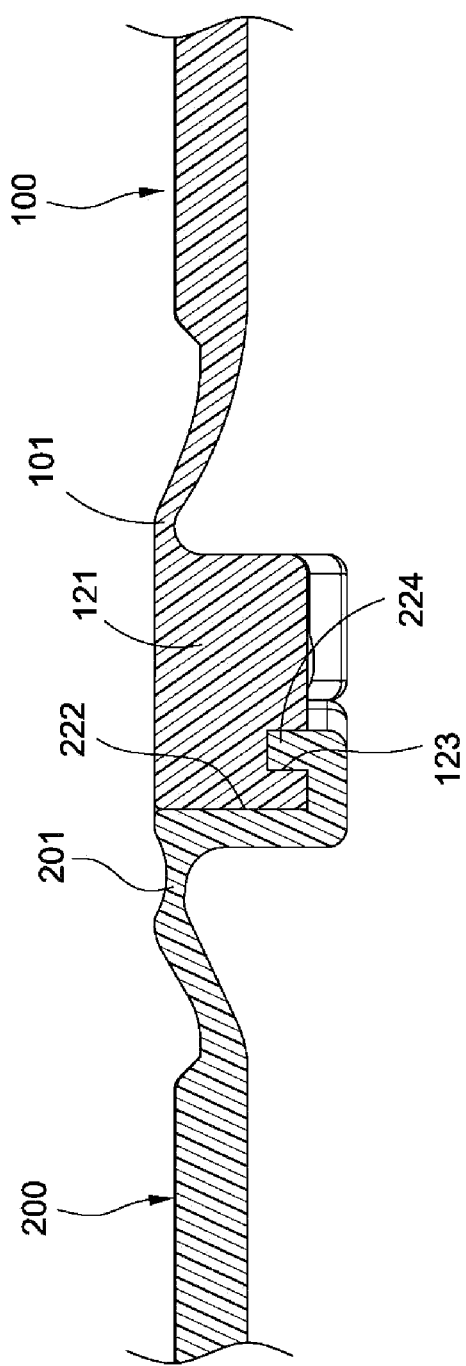
FIG. 13 and FIG. 14 are section diagrams of FIG. 12.
Figure 14:
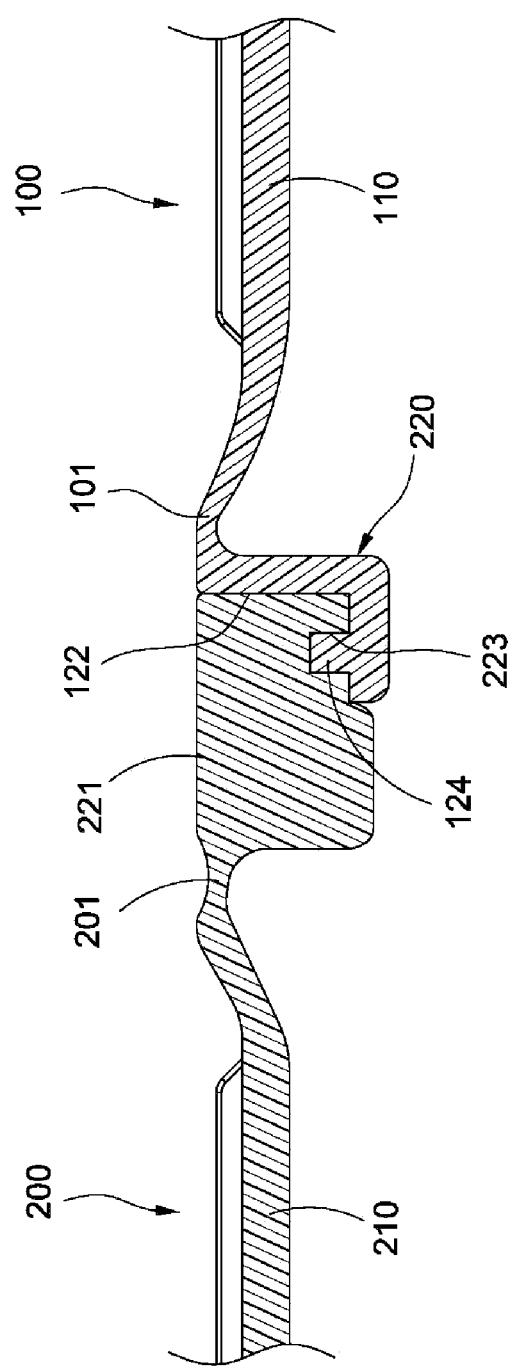

A first sliding fastener 130 for fitting connecting the body 10 is sleeved on another surface of the first cover plate 110. The first sliding fastener 130 is provided with at least one fitting connecting hole 133 corresponding to the corresponding first positioning hole 111 for the corresponding first hook 141 to be fitting connected to an inner edge of the first fitting connecting hole 133, as shown in FIG. 5, accordingly fixing the first sliding fastener 130 and the first sealing plug 140 to the first cover plate 110. The first sliding fastener 130 and the first sealing plug 140 are fitting connected and assembled, and are thus easily disassembled and can be readily design changed corresponding to the differently shaped first openings 11 on different models. Moreover, the first sliding fastener 130 is movable relative to the first cover plate 110 so as to release the body 10. Specifically, the first sliding fastener 130 is a U-shaped cover, and two sides of the first sliding fastener 130 form a pair of correspondingly configured first sidewalls 131, wherein each of the first sidewalls 131 is provided with at least one first sliding tenon 132 in a protruding manner. Referring to FIG. 9, a first sliding groove 21 corresponding to the first sliding tenon 132 is provided on the periphery of the first opening 11 of the body 10. The first sliding fastener 130 is movable relative to the first cover plate 110 to allow the first sliding tenon 132 to be fitted into the corresponding first sliding groove 21 so as to lock the first cover plate 110. Referring to FIG. 10, when the first sliding fastener 130 is movable in a reverse direction relative to the first cover plate 110, the first sliding tenon 132 is allowed to exit the corresponding first sliding groove 21 so as to release the first cover plate 110. In addition, referring to FIG. 2 and FIG. 4, the length of the first fitting connecting hole 133 is more than the length of the first positioning hole 111, and when the first sliding fastener 130 moves relative to the first cover plate 110, the first hook 141 is fixed relative to the first cover plate 110. Using the foregoing configuration, when the first sliding fastener 130 moves relative to the first cover plate 110, the first fitting connecting hole 133 has enough vertical space for avoiding the first hook 141 so as to prevent interference.

Figure 3:
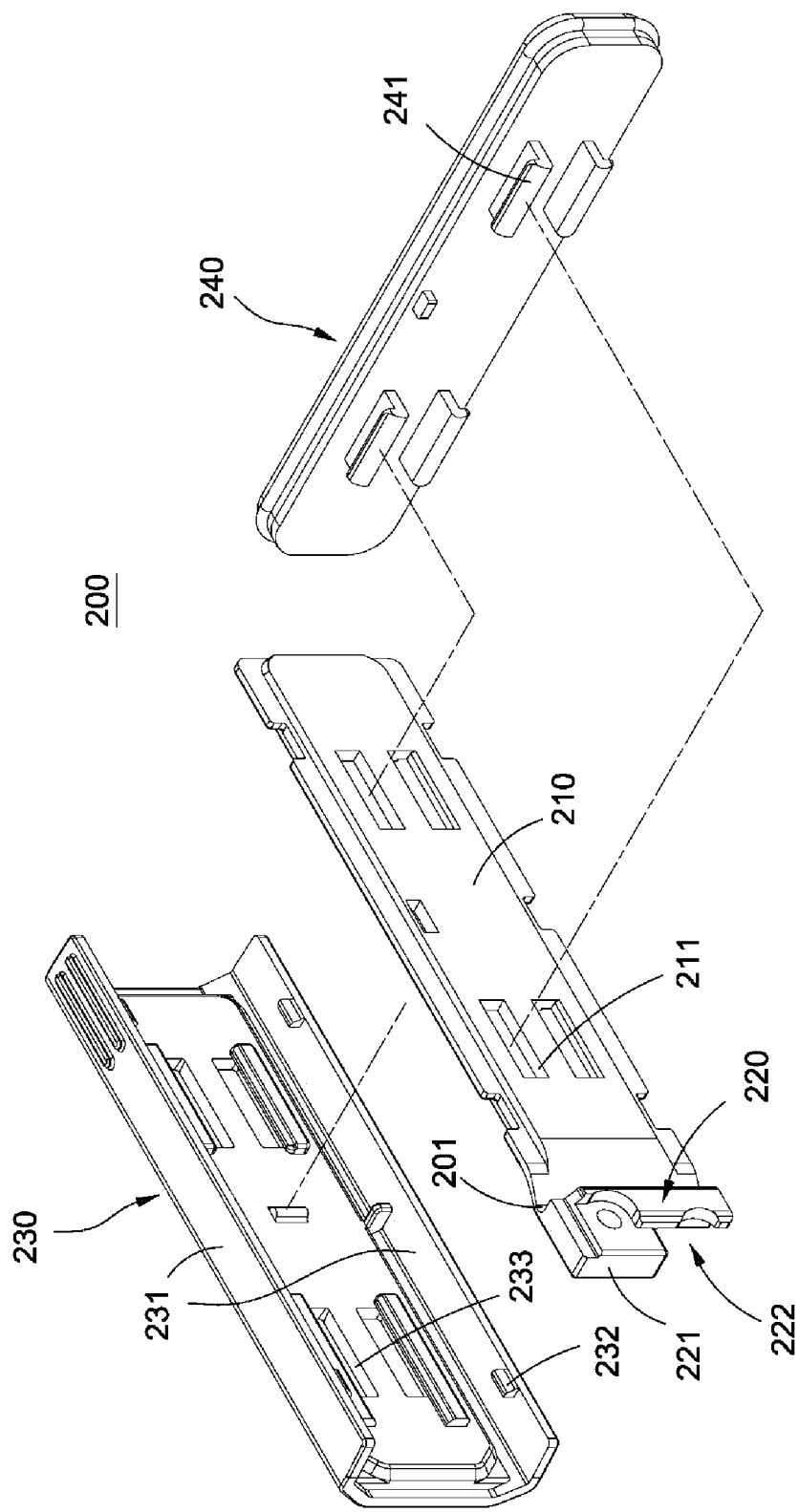
FIG. 3 is an exploded three-dimensional schematic diagram of a second cover in a cover structure of a mobile device according to the first embodiment of the present invention.

Referring to FIG. 2 and FIG. 3, in this embodiment, the structure of the second cover plate 210 is substantially the same as that of the first cover plate 110 in FIG. 2. Referring to FIG. 3, a second sealing plug 240 is provided on a surface of the second cover plate 210. When the second cover plate 210 covers the second opening 12, the second sealing plug 240 is sandwiched between the second cover plate 210 and the body 10, and seals the second opening 12. Specifically, the second cover plate 210 is provided with at least one second positioning hole 211. In this embodiment, the second cover plate 210 is preferably provided with four second positioning holes 211 with the same function; however, the present invention does not limit the number of the second positioning holes. At least one second hook 241 is correspondingly extended on the second sealing plug 240. In this embodiment, four second hooks 241 are preferably extended on the second sealing plug 240, and each of the second hooks 241 is fitting connected in the corresponding second positioning hole 211, accordingly fixing the second sealing plug 240 to the second cover plate 210.

A second sliding fastener 230 for fitting connecting the body 10 is sleeved on another surface of the second cover plate 210. The second sliding fastener 230 is provided with at least one second fitting connecting hole 233 corresponding to the corresponding second positioning hole 211 for the corresponding second hook 241 to be fitting connected to an inner edge of the second fitting connecting hole 233, thereby fixing the second sliding fastener 230 and the second sealing plug 240 to the second cover plate 210. The second sliding fastener 230 and the second sealing plug 240 are fitting connected and assembled, and are thus easily disassembled and can be readily design changed corresponding to the differently shaped second openings 12 on different models. Moreover, the second sliding fastener 230 is movable relative to the second cover plate 210 so as to release the body 10. Specifically, the second sliding fastener 230 is a U-shaped cover, and two sides of the second sliding fastener 230 form a pair of correspondingly configured second sidewalls 231, wherein each of the second sidewalls 231 is provided with at least one second sliding tenon 232 in a protruding manner. Referring to FIG. 9, a second sliding groove 22 corresponding to the second sliding tenon 232 is provided on the periphery of the second opening 12 of the body 10. The second sliding fastener 230 is movable relative to the second cover plate 210 to allow the second sliding tenon 232 to be fitted into the corresponding second sliding groove 22 so as to lock the second cover plate 210. Referring to FIG. 10, when the second sliding fastener 230 is movable in a reverse direction relative to the second cover plate 210, the second sliding tenon 232 is allowed to exit the corresponding second sliding groove 22 so as to release the second cover plate 210. In addition, referring to FIG. 3, the length of the second fitting connecting hole 233 is more than the length of the second positioning hole 211, and when the second sliding fastener 230 moves relative to the second cover plate 210, the second hook 241 is fixed relative to the second cover plate 210. Using the foregoing configuration, when the second sliding fastener 230 moves relative to the second cover plate 210, the second fitting connecting hole 233 has enough vertical space for avoiding the second hook 241 so as to prevent interference.

Referring to FIG. 11 to FIG. 14, to further reinforce the fixing stability between the first seat plate 120 and the second seat plate 220, the first protrusion 121 can be provided with a first hook groove 123, and the first receiving slot 122 can be provided with a first inverted hook 124 in a protruding manner; correspondingly, the second protrusion 221 can be provided with a second hook groove 223, and the second receiving slot 222 can be provided with a second inverted hook 224 in a protruding manner. When the first protrusion 121 is received in the second receiving slot 222, the second inverted hook 224 in the second receiving slot 222 can be hooked with the first hook groove 123 on the first protrusion 121. When the second protrusion 221 is received in the first receiving slot 122, the first inverted hook 124 in the first receiving slot 122 can be hooked with the second hook groove 223 on the second protrusion 221. The mutual hook structure of the edges enables the first seat plate 120 and the second seat plate 220 to securely contain each other so as to prevent unexpected disengagement.

Figure 15:
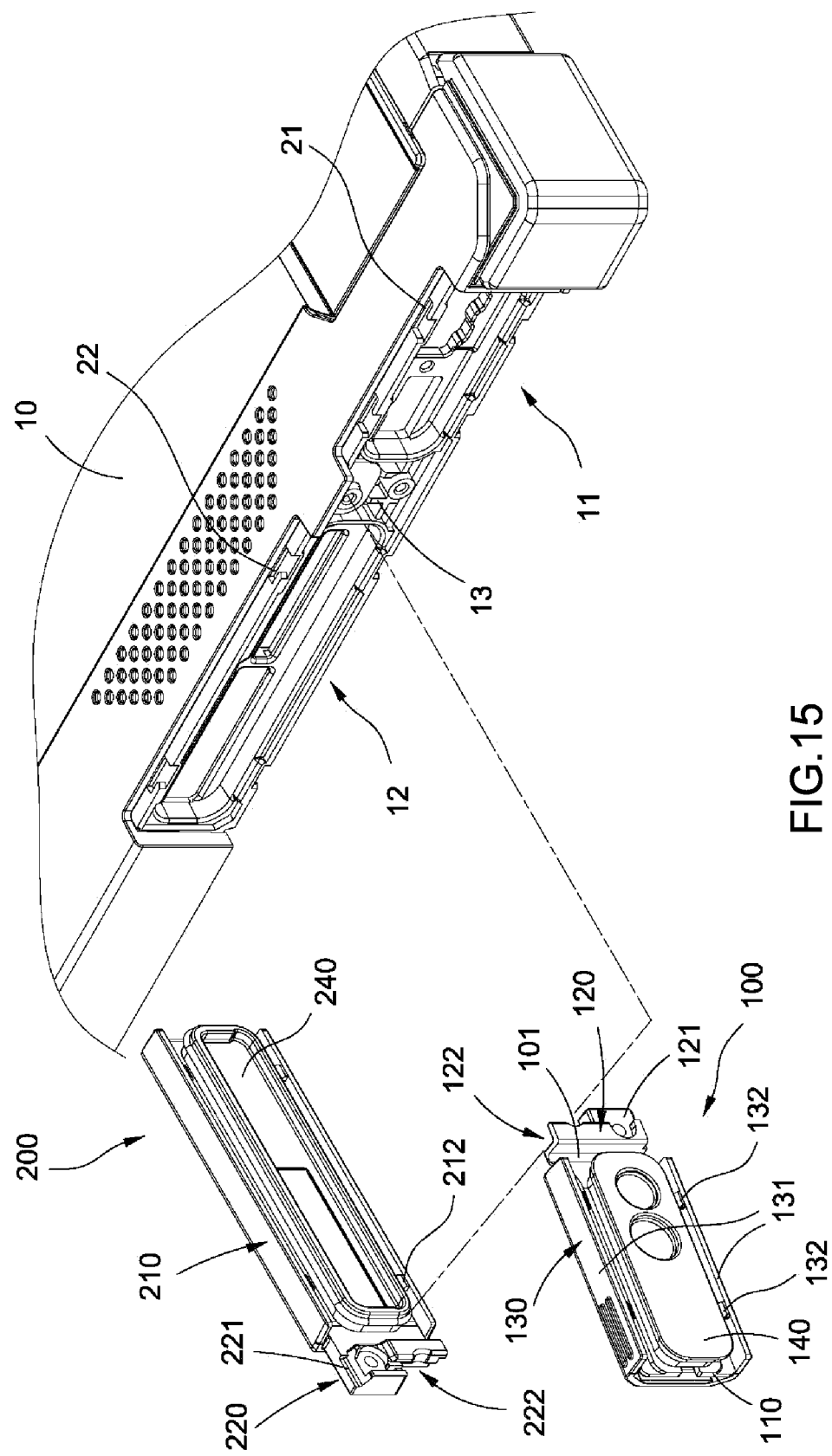
FIG. 15 is an exploded three-dimensional schematic diagram of a door structure of a mobile device according to a second embodiment of the present invention.

Referring to FIG. 15, a cover structure of a mobile device is provided according to a second embodiment of the present invention. The cover structure includes a body 10, a first cover 100 and a second cover 200. The body 10 is provided with a first opening 11 and a second opening 12. The first opening 11 and the second opening 12 are adjacent and are disposed at an interval from each other so as to form a frame 13 between the first opening 11 and the second opening 12. At least one first connector is disposed in the first opening 11. The second opening 12 may be idle, or other electronic elements that are not connection ports, for example, a hard drive or a memory, may be disposed in the second opening 12.

The first cover 100 includes a first cover plate 110 and a first seat plate 120. The first cover plate 110 and the first seat plate 120 are integrally connected. The first seat plate 120 is disposed in a protruding manner on a side edge of the first cover plate 110, and is fixedly connected to the frame 13. In this embodiment, preferably, the first seat plate 120 is fixedly connected to the frame 13 by means of locking with a screw. The first cover plate 110 covers the first opening 11, and is turnable relative to the first cover plate 120 so as to open the first opening 11. Specifically, a first bend groove 101 is provided between the first cover plate 110 and the first seat plate 120, accordingly allowing the first cover plate 110 to turn relative to the first seat plate 120 along the first bend groove 101.

The second cover 200 includes a second cover plate 210 and a second seat plate 220. The second cover plate 210 and the second seat plate 220 are integrally connected. The second seat 220 is disposed in a protruding manner on one side edge of the second cover plate 210, and is fixedly connected to the frame 13. In this embodiment, preferably, the second seat plate 220 is fixedly connected to the frame 13 by means of locking with a screw. The second cover plate 210 covers the second opening 12, and the second cover plate 210 and the second seat plate 220 are fixed and are immovable relative to other so as to enclose the second opening 12.

Figure 16:
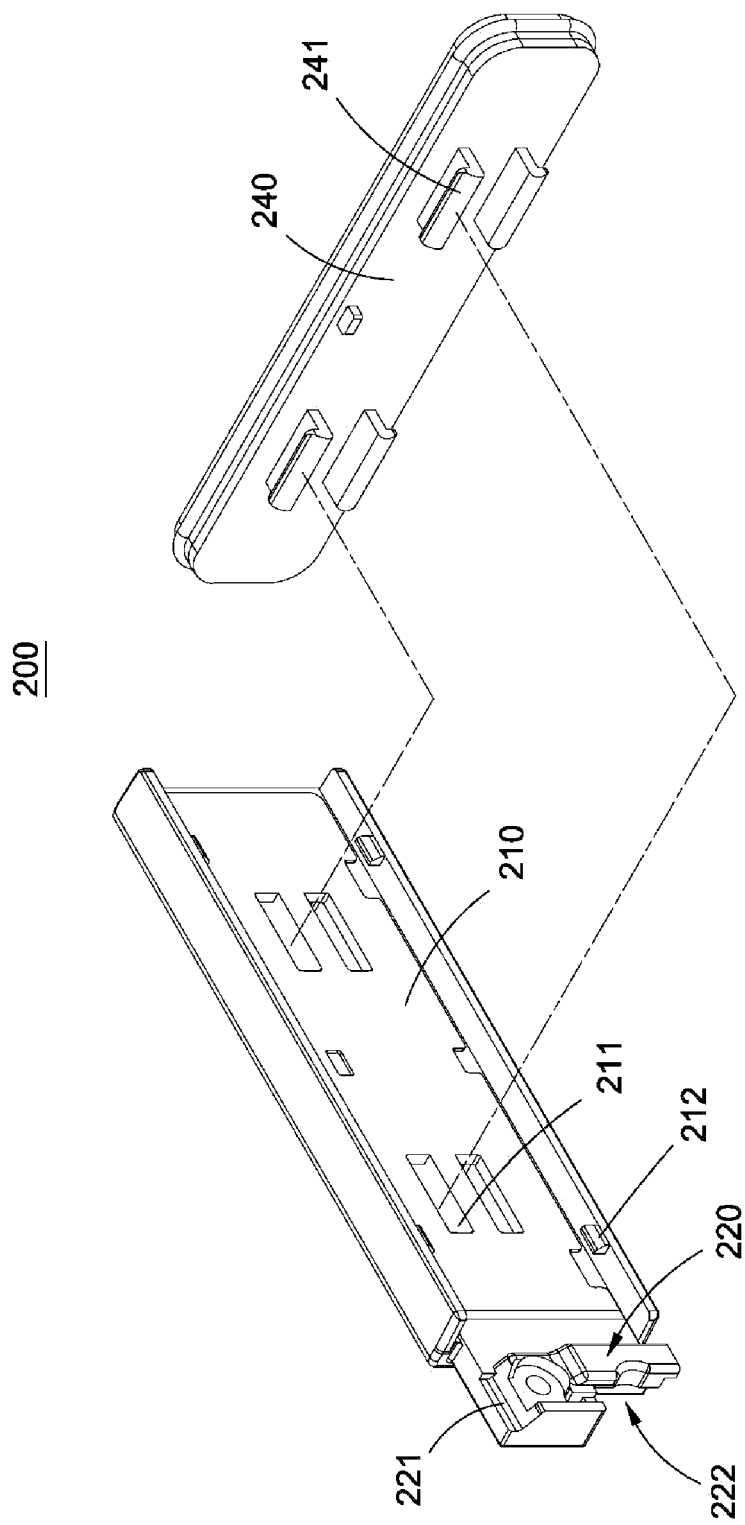
FIG. 16 is an exploded three-dimensional schematic diagram of a second cover in a cover structure of a mobile device according to the second embodiment of the present invention.

Referring to FIG. 16, in this embodiment, a first protrusion 121 is formed on one side of the first seat plate 120, and is provided with a first lock hole for locking the first protrusion 121 to the frame 13 of the body 10, and a first receiving slot 122 located next to the first protrusion 121 is formed on the other side of the first seat plate 120. A second protrusion 221 is formed on one side of the second seat plate 220, and is provided with a second lock hole for locking the second protrusion 221 to the frame 13 of the body 10, and a second receiving slot 222 located next to the second protrusion 221 is formed on the other side of the second seat plate 220. The first protrusion 121 and the second protrusion 221 are locked next to each other on the frame 13, such that contours of edges of the first seat plate 120 and the second plate 220 are fitted with each other. In addition, the first protrusion 121 is fixedly received in the second receiving slot 222, and the second protrusion 221 is fixedly received in the first receiving slot 122, thereby allowing the edge of the first seat plate 120 and the edge of the second seat plate 220 to overlap with each other and the edge of the first seat plate 120 and the edge of the second seat plate 220 to be fixedly connected with each other.

Details of the first cover 100 are as that described in the first embodiment, and are omitted herein. The differences of this embodiment from the first embodiment are to be given in detail shortly below. Referring to FIG. 16, the second cover plate 210 is a U-shaped cover, and is provided with at least one tenon 212 in a protruding manner. The tenon 212 is for fitting into the second sliding groove 22 on the periphery of the second opening 12, as shown in FIG. 9, so as to fix the second cover plate 210 to the second opening 12. A second sealing plug 240 is provided on an inner side surface of the second cover plate 210. When the second cover plate 210 covers the second opening 12, the second sealing plug 240 is sandwiched between the second cover plate 210 and the body 10, and seals the second opening 12. Specifically, the second cover plate 210 is provided with at least one second positioning hole 211. In this embodiment, the second cover plate 210 is preferably provided with four second positioning holes 211 with the same function; however, the present invention does not limit the number of the second positioning holes. At least one second hook 241 is correspondingly extended on the second sealing plug 240. In this embodiment, four second hooks 241 are preferably extended on the second sealing plug 240, and each of the second hooks 241 is fitting connected in the corresponding second positioning hole 211, accordingly fixing the second sealing plug 240 to the second cover plate 210.

In the cover structure of a mobile device of the present invention, the first cover 100 and the second cover 200 can share the same fixing point between the first opening 11 and the second opening 12. In addition, the first cover 100 and the second cover 200 can be replaced individually. When one of the first cover 100 and the second cover 200 is damaged, only the one with damage needs to be replaced instead of simultaneously replacing both the first cover 100 and the second cover 200, thereby avoiding unnecessary waste and reducing maintenance cost. Moreover, the cover structure of a mobile device of the present invention is capable of providing either of the first cover 100 and the second cover 200 with a replacement design, hence offering good application flexibilities. The first cover 100 or the second cover 200 can be designed as an unopenable structure, as that described in the second embodiment.

When the first opening 11 or the second opening 12 is configured with a functional element, the corresponding first cover 100 or second cover 200 can be designed as an unopenable structure so as to seal the first opening 11 or the second opening 12. For a utilization requirement demanding a high security level, the corresponding first cover 100 or second cover 200 can be designed as an unopenable structure so as to prevent erroneously opening thereof that may trigger flash or gas explosion. For a utilization requirement demanding a high level confidentiality level, the corresponding first cover 100 or second cover 200 can be designed as an unopenable structure so as to prevent theft of confidential information thereof.

The description above is merely preferred embodiments of the present invention, and is not to be construed as limitations to the scope of claims of the present invention. Other equivalent changes practicing the inventive spirit of the present invention are to be encompassed within the scope of the claims of the present invention.

What is claimed is:

1. A cover structure of a mobile device, comprising:
   a body, provided with a first opening and a second opening, the first opening and the second opening being adjacent and being configured at an interval from each other so as to form a frame between the first opening and the second opening;
   a first cover, comprising a first cover plate and a first seat plate, the first seat plate being disposed in a protruding manner on a side edge of the first cover plate, the first seat plate being fixedly connected to the frame, the first cover plate covering the first opening and being turnable relative to the first seat plate so as to open the first opening; and
   a second cover, comprising a second cover plate and a second seat plate, the second seat plate being disposed in a protruding manner on a side edge of the second cover plate, the second seat plate being fixedly connected to the frame, the second cover plate covering the second opening.

2. The cover structure of a mobile device according to claim 1, wherein a first bend groove is provided between the first cover plate and the first seat plate, and the first cover plate is turnable relative to the first seat plate along the first bend groove.

3. The cover structure of a mobile device according to claim 1, wherein at least one first connector is disposed in the first opening.

4. The cover structure of a mobile device according to claim 1, wherein contours of edges of the first seat plate and the second seat plate are fitted with each other.

5. The cover structure of a mobile device according to claim 1, wherein an edge of the first seat plate and an edge of the second seat plate overlap with each other.

6. The cover structure of a mobile device according to claim 1, wherein an edge of the first seat plate and an edge of the second seat plate are hooked with each other.

7. The cover structure of a mobile device according to claim 1, wherein the first cover plate is provided with a first sliding fastener for fitting connecting the body, and the first sliding fastener is movable relative to the first cover plate so as to release the body.

8. The cover structure of a mobile device according to claim 1, wherein a first sealing plug is provided on a surface of the first cover plate, and when the first cover plate covers the first opening, the first sealing plug is sandwiched between the first cover plate and the body and seals the first opening.

9. The cover structure of a mobile device according to claim 1, wherein a first sealing plug is provided on a surface of the first cover plate, when the first cover plate covers the first opening, the first sealing plug is sandwiched between the first cover plate and the body and seals the first opening, a first sliding fastener for fitting connecting the body is sleeved on another surface of the first cover plate, and the first sliding fastener is movable relative to the first cover plate so as to release the body.

10. The cover structure of a mobile device according to claim 1, wherein a second sealing plug is provided on a surface of the second cover plate, and when the second cover plate covers the second opening, the second sealing plug is sandwiched between the second cover plate and the body and seals the second opening.

11. The cover structure of a mobile device according to claim 10, wherein a first sealing plug is provided on a surface of the first cover plate, and when the first cover plate covers the first opening, the first sealing plug is sandwiched between the first cover plate and the body and seals the first opening.

12. The cover structure of a mobile device according to claim 1, wherein the second cover plate is turnable relative to the second seat plate.

13. The cover structure of a mobile device according to claim 12, wherein a second bend groove is provided between the second cover plate and the second seat plate, and the second cover plate is turnable relative to the second seat plate along the second bend groove so as to open the second opening.

14. The cover structure of a mobile device according to claim 12, wherein the first cover plate is provided with a first sliding fastener for fitting connecting the body, and the first sliding fastener is movable relative to the first cover plate so as to release the body.

15. The cover structure of a mobile device according to claim 12, wherein a first sealing plug is provided on a surface of the first cover plate, when the first cover plate covers the first opening, the first sealing plug is sandwiched between the first cover plate and the body and seals the first opening, a first sliding fastener for fitting connecting the body is sleeved on another surface of the first cover plate, and the first sliding fastener is movable relative to the first cover plate so as to release the body.

16. The cover structure of a mobile device according to claim 12, wherein at least one second connector is disposed in the second opening.

* * * * *